United States Patent [19]

Matsunawa et al.

[11] Patent Number: 4,741,046
[45] Date of Patent: Apr. 26, 1988

[54] METHOD OF DISCRIMINATING PICTURES

[75] Inventors: Masahiko Matsunawa, Hino; Yasufumi Emori, Kana; Yoshizumi Yasuda, Kashiwa, all of Japan

[73] Assignee: Konishiroku Photo Industry Co., Ltd., Tokyo, Japan

[21] Appl. No.: 757,653

[22] Filed: Jul. 22, 1985

[30] Foreign Application Priority Data

Jul. 27, 1984 [JP] Japan .................................. 59-157894
Jul. 27, 1984 [JP] Japan .................................. 59-157895

[51] Int. Cl.⁴ .......................................... G06K 9/34
[52] U.S. Cl. ..................................... 382/9; 382/18; 382/51; 358/282; 358/283
[58] Field of Search ............... 382/9, 18, 48, 51, 41, 382/49, 54; 358/282, 283, 280, 296, 298

[56] References Cited

U.S. PATENT DOCUMENTS

| | | | |
|---|---|---|---|
| 4,258,393 | 3/1981 | Ejiri | 358/283 |
| 4,403,257 | 9/1983 | Hsieh | 358/280 |
| 4,411,015 | 10/1983 | Scherl et al. | 382/51 |
| 4,447,830 | 5/1984 | Stoffel | 358/283 |
| 4,447,831 | 5/1984 | Adsett | 358/283 |
| 4,495,522 | 1/1985 | Matsunawa et al. | 358/280 |

Primary Examiner—Leo H. Boudreau
Assistant Examiner—Jose L. Couso
Attorney, Agent, or Firm—James E. Nilles

[57] ABSTRACT

A method of discriminating pictures, wherein a picture is binary-coded. The variation in the number of foreground pixels constituting foreground pixel regions within a discrimination unit area is determined. Alternatively the variation in the distance between said foreground pixel regions is determined. It is then determined by a known relationship whether the discrimination unit area is of a dot gradation picture or not. If the picture is not a dot gradation picture, the rate of background is measured to determine whether the above discrimination unit area is of a line picture or of a continuous tone picture.

7 Claims, 6 Drawing Sheets

FIG. 1
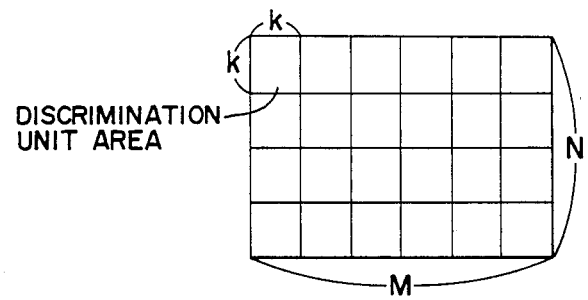
FIG. 2(a)    FIG. 2(b)
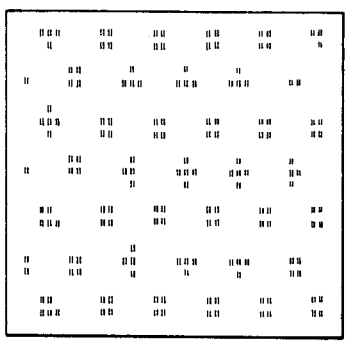    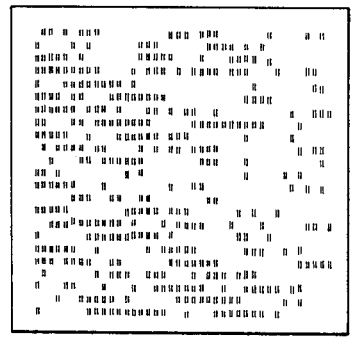
FIG. 4    FIG. 3
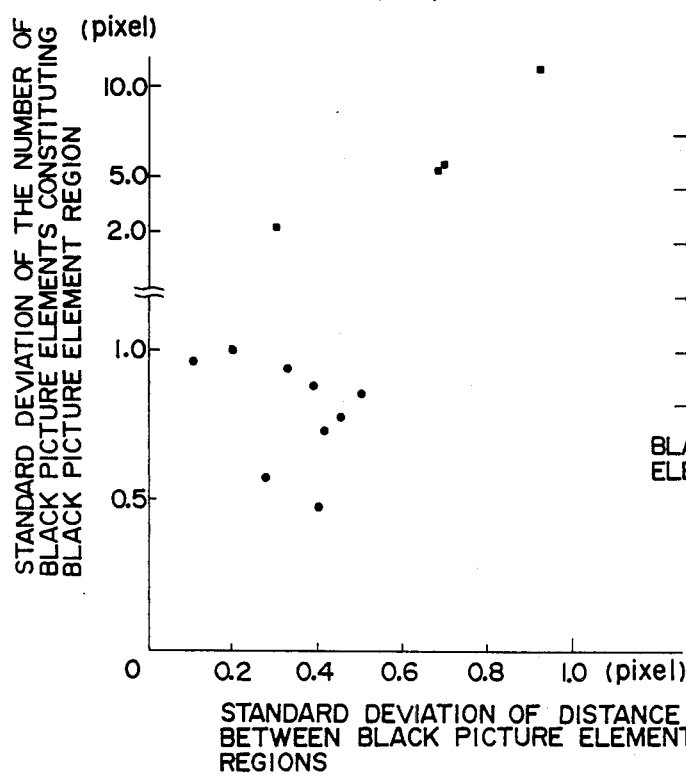    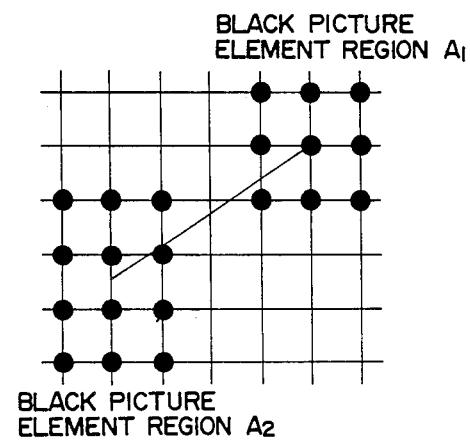

METHOD OF DISCRIMINATING PICTURES

BACKGROUND OF THE INVENTION

1. Field of the Invention

The present invention relates to a method of discriminating pictures, whereby a picture is sorted and discriminated into regions of a line picture, a halftone dot picture and a continuous tone picture.

2. Description of the Prior Art

Methods presented in the following documents, for instance, are known as conventional methods of discriminating pictures.

(1) "Extraction of structural information in documentary pictures", Mitsuhiro Murao, Toshifumi Sakai, 1980, 21st National Meeting of the Information Processing Institute, 7H-1.

(2) "Real-time discrimination of halftone pictures in documentary pictures", Morizumi Kurose, Koichi Ejiri, Akira Sakurai, 1981, 23rd National Meeting of the Information Processing Institute, 6C-6.

(3) "Binary reproduction of documentary pictures including gradation regions", Hiroshi Makino, Yukihisa Akada, Shingakuron, (D)J65-D, 3, pp. 307~314, March, 1982.

(4) "Sorting of pictures by computer for compression coding", August, 1982, Shingakuron, (D)J65-D, 8, pp. 1018~1025.

(5) Japanese Patent Laid-Open No. 132061/1981, "Detecting system for dot picture signals".

(6) "Reproduction of values in newspaper halftone", Hiroshi Ueno, Takayoshi Semasa, Printing Magazine, 1983 (Vol. 66) 1, pp. 15~23.

(7) Japanese Patent Laid-Open No. 149674/1981, "Discriminating method of picture characteristics".

These conventional methods are intended mainly for discrimination between line pictures and continuous tone pictures, and between line pictures and a halftone dot pictures. In reality, however, the line picture, the halftone dot picture and the continuous tone picture may all exist simultaneously in most all complete pictures; therefore, a method of discriminating said three kinds of pictures is needed. From such a viewpoint, the present inventors proposed the method of discriminating the above three kinds of pictures in an article entitled "Study of picture discriminating method", in the Overall National Meeting of the Electronic Communication Institute, 1167. Said method, however, had a problem in that it tended to make an error in discrimination of a continuous picture in which density varied sharply.

In this relation, an article entitled "Recognition of rectangular fields in facsimile document and handwritten discrimination numbers therein", 12th Picture-Engineering Conference 7-2, is known as a proposal for a region-extracting method for extracting picture regions of the same kind from a picture. According to this method, first a picture is divided into small regions; then, it is binary-coded and thereafter the small regions in the entire picture are collected in a plurality of large rectangular regions. Next, each large rectangular region is divided into window regions, and the probability of occurrence of a black picture element and the local deviation thereof within a window are determined. In addition, the amount of data area-projected on coordinate axes (X, Y) is determined as peripheral distribution. Then, the attributes of "photograph", "drawing" and "writing" are discerned according to the probability of occurrence of the black picture element and the local deviation thereof within the window, and the periodicity of the peripheral distribution is checked. Based on the results of these processes, determination is made between "writing" and "drawing", and the extraction of regions is conducted.

This method, however, has problems that it is inadequate for coping with regions having arbitrary forms since the process of collecting regions in the large rectangular regions together is taken initially, and that the extraction of regions is difficult for a character unit having no periodicity. Thus, an art adaptable for any arbitrary form and picture ("picture" means not only a tonal image) has been wanted.

SUMMARY OF THE INVENTION

The present invention is designed in view of the aforesaid problems, and an object thereof is to provide a method of discriminating pictures, which enables the determination of a continuous tone picture even when its density varies sharply.

The method of the present invention designed for solving the aforesaid problems is characterized in that, a picture is first binary-coded. The variation in the number of black picture elements constituting black picture element regions within a discrimination unit area is determined. Alternatively, the variation in distance between said black picture element regions is determined. It is then determined from said variations whether said discrimination unit area is of a halftone dot picture or not. Finally, if the picture is not a halftone dot picture, it is determined from the rate of background whether the above discrimination unit area is of a line picture or not.

Another object of the present invention is to provide a method of extracting regions, which enables the extraction of picture regions of any form.

The method of the present invention for solving the aforesaid problems is characterized in that, a picture is divided into a plurality of blocks, each block is sorted in prescribed patterns by using binary-coded picture data, the connection between said blocks is checked according to said patterns, and picture regions of the same kind are extracted. Other objects and characteristics of the present invention will be made apparent hereunder with reference to drawings.

BRIEF DESCRIPTION OF THE DRAWINGS

FIG. 1 is an illustration of one example of a discrimination unit area;

FIG. 2(a) and FIG. 2(b) are illustrations of binary-coded pictures;

FIG. 3 illustrates the measurement of a distance between black picture element regions;

FIG. 4 shows the relationship between the standard deviation of the distance between the black picture element regions and the standard deviation of the number of black picture elements constituting the black picture element regions;

DESCRIPTION OF THE PREFERRED EMBODIMENTS

Figure 5:
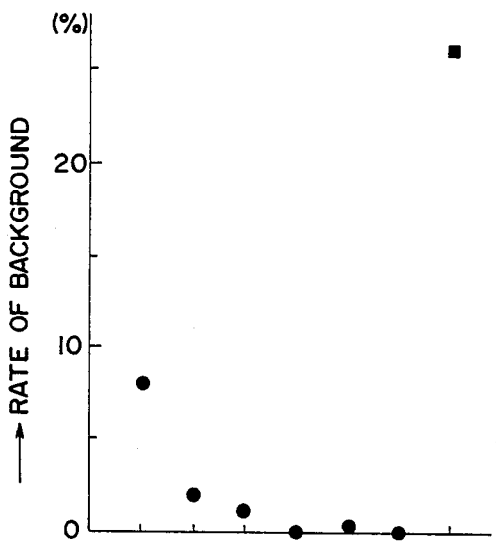
FIG. 5 is a graph comparing the percent of background of continuous tone pictures to that of a line picture

A concrete example of the method of the present invention will be described hereunder with reference to the drawings.

According to the method to be described hereunder, first a picture is divided into a plurality of discrimination unit areas (the minimum units for determining whether a given picture is a line picture, a halftone dot picture or a continuous tone picture). When the given picture is composed of $N \times M = 2000 \times 2500$ picture elements (10 dot/mm) as shown in FIG. 1, for instance, the sizes of a discrimination unit area are set as $k \times k = 32 \times 32$ picture elements (hereafter referred to as "pixels"). Next, the picture is binary-coded, and regions of black pixels are determined on the basis of pixels for each discrimination unit area. Hereafter reference will be made to "foreground" pixels and to "background" pixels. In the case of a black-on-white picture, foreground will refer to black pixels and background to white. Of course in the case of a reverse video picture, that is, white-on-black, foreground refers to white and background to black. A "foreground pixel region", often referred to simply as a "region", includes any one foreground pixel and any additional foreground pixels which are immediately adjacent to the one foreground pixel or any continuously adjacent pixels in one of the major directions, that is, upward, downward, right and left. If there are no immediately adjacent foreground pixels in the directions indicated, then the one foreground pixel may by itself constitute a foreground pixel region. FIG. 2(a) and FIG. 2(b) illustrate examples of binary-coded halftone dot and continuous tone pictures respectively (vertical parallel lines (in a pair) in the figures denote one foreground pixel. It is found from the figures that the variation in the number of foreground pixels constituting each foreground pixel region and the variation in the distance between these regions are small in the halftone dot picture while these variations are large in the continuous tone picture. The variations are large also in a line picture, though not shown in the figures. In view of these points, according to the method of the present invention, the variation, such as standard deviation, in the number of foreground pixels constituting each region and the variation (standard deviation or the like) in the distance between the regions are determined in each discrimination unit area for determining whether a given picture is a halftone dot picture. FIG. 3 shows one example of positions for measuring a distance between foreground pixel regions $A_1$ and $A_2$, and it indicates that the distance between the centers of the regions $A_1$ and $A_2$ are measured. FIG. 4 shows a graph of the standard deviation of the number of the foreground pixels within the regions and the standard deviation of the distance therein, which are determined as described above, taking the former deviation as the ordinate and the latter as the abscissa. In the figure, black circles denote the coordinates of the standard deviation found in some discrimination unit areas of a halftone dot picture, while black squares denote those found in some discrimination unit areas of the other pictures. It is found from the figure that both of the standard deviations of the number of the foreground pixels in a region and the distance between these regions in the halftone dot picture are smaller than those in the other pictures, and this tendency can be seen invariably in many samples. In the method of the present invention, accordingly, whether a given discrimination unit area is of the halftone dot picture or not is determined from whether both or either of these standard deviations (the standard deviation of the number of the foreground pixels, in particular) are smaller than a prescribed value or not. When the standard deviation of the number of the foreground pixels is found within about 1.0 pixel, the given area is determined to be of the halftone dot picture.

Next, the rate of background is checked according to the method of the present invention. This rate is proportional to the number of background pixels in the given discrimination unit area, since the sizes of the discrimination unit area are fixed, and therefore said rate can be calculated easily by finding the total number of the background pixels or that of the foreground pixels in the discrimination unit area. Practically, the total number of the background pixels or that of the foreground pixels may be used as the data representing the rate of background pixels, dispensing with calculation. FIG. 5 is a graph showing the rate of the background, the axis of abscissa indicating each sample of the discrimination unit area. In the figure, black circles denote said rate in the discrimination unit area of the continuous tone picture, while black squares denote that of the line picture. The rate of the background is great in the line picture, and thus its difference from that in the continuous tone picture is great. Accordingly, it is easy to determine whether a given picture is a line picture or not, excepting for the case of the halftone dot picture already determined by reference to FIG. 4.

The above-described method being fully executed, it can be said that the discrimination among the line picture, the halftone dot picture and the continuous tone picture is effected.

The above description relates to the case when discrimination is performed for the whole regions of picture, and when any regions of the picture are extracted, the aforesaid method can also be applied to each picture region. Such an application enables efficient discrimination, because the area of regions to be subjected to the discrimination is made narrower in this case.

Figure 6:
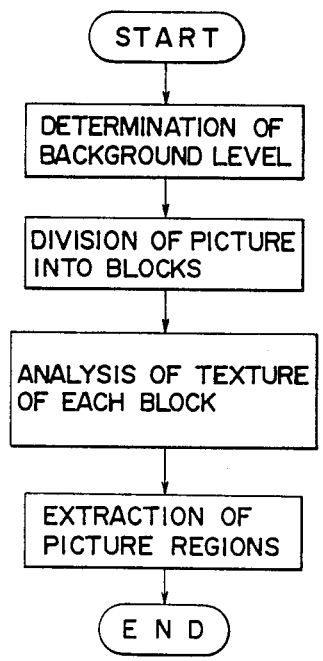
FIG. 6 is a flowchart showing steps of a process in one concrete example of a method of extracting regions.

A description will be made hereunder on one example of a method of extracting picture regions. FIG. 6 is a flowchart showing steps of a process in one concrete example, of this method of extraction. In this example, first a background level (density level) is determined, and a picture is then divided into blocks. Thereafter, pixels within each block are binary-coded on the basis of a threshold value determined from the background level, the texture of each block is analyzed on the basis of the binary-coded picture data to sort the blocks into prescribed patterns, connections between the blocks are checked according to said patterns, and thereby picture regions of the same sort are extracted. The sequence of the determination of the background level and the division of a picture into blocks may be reversed.

Next, the steps of the aforesaid process will be described hereunder in detail.

(I) Determination of background level

Figure 7:
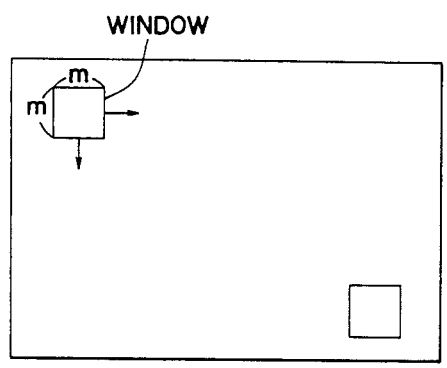
FIG. 7 is an illustration of a window portion of a subject picture.
Figure 8:
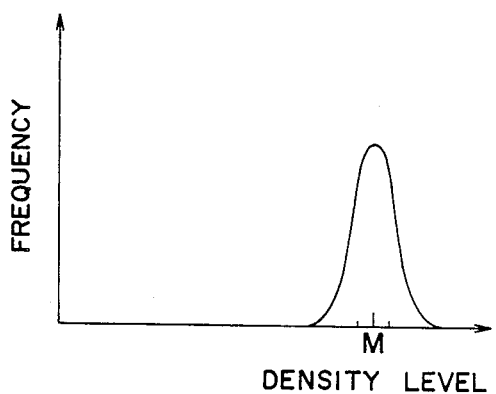
FIG. 8 illustrates a density histogram.
Figure 9:
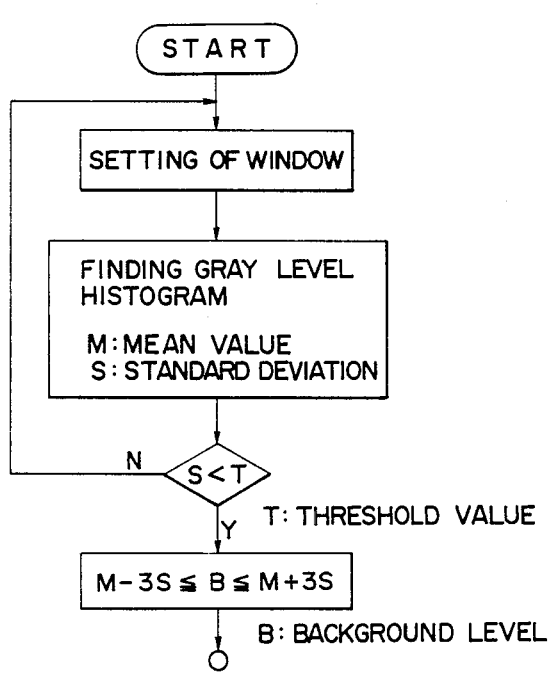
FIG. 9 is a flowchart showing steps of a process for determining a level of the background.

With a view to determine the background level in a short time, a window of m×m (e.g. 32×32) picture elements is provided in a picture area, as shown in FIG. 7, a density histogram as shown in FIG. 8 is prepared on the basis of the data of a picture within said window, and the background level is determined therefrom. FIG. 9 is a flowchart showing steps of a process for determining the background level. First, the window is established (the determination of a position), then a density histogram is prepared on the basis of this window, and a mean value M and a standard deviation S are calculated therefrom. Next, when the standard deviation S is smaller than a prescribed threshold value T, the background level B is selected as a value within the limits:

$$M-3S \leq B \leq M+3S.$$

The value is normally set to be $B=M+3S$. When the standard deviation S is larger than the threshold value T, the position of the window is shifted in the lateral or longitudinal direction in FIG. 7 to set another window, and the density histogram is prepared again. This is because the window is not located at a position enabling the excellent perception of a texture when $S \geq T$. The threshold value T may be large or small provided that it is within a range enabling the perception of the texture. It is preferably such a value as enables the setting of the window the minimum number of times.

(II) Division of picture into blocks

Figure 10:
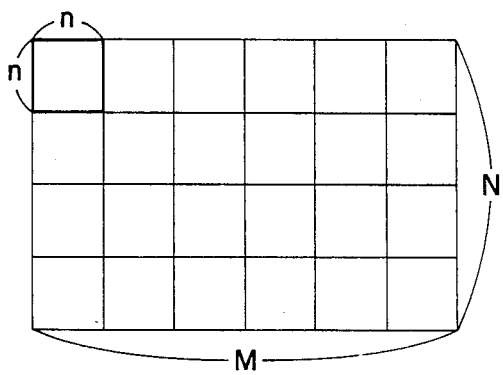
FIG. 10 illustrates the division of a picture into blocks.

A given picture is divided into a plurality of blocks. If the picture is composed of $N \times M = 2000 \times 2500$ picture elements (10 dot/mm) as shown in FIG. 10, for instance, the sizes of each block are set to be $n \times n = 32 \times 32$. They can be selected, of course, to be 16×16, 64×64 or others.

(III) Analysis of texture of each block

Figure 11:
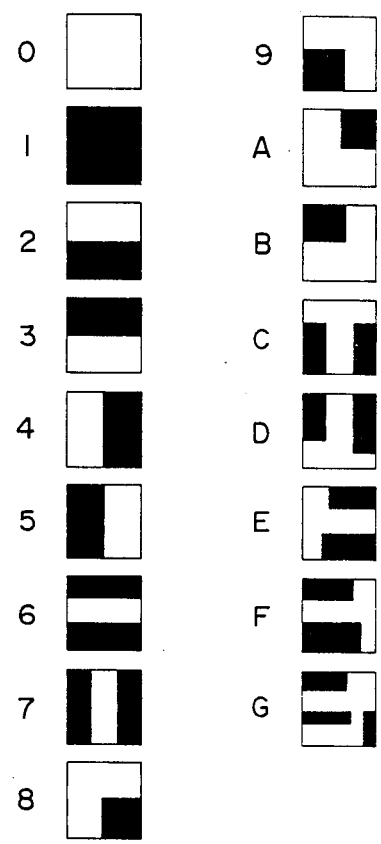
FIG. 11 illustrates patterns of blocks.
Figure 12:
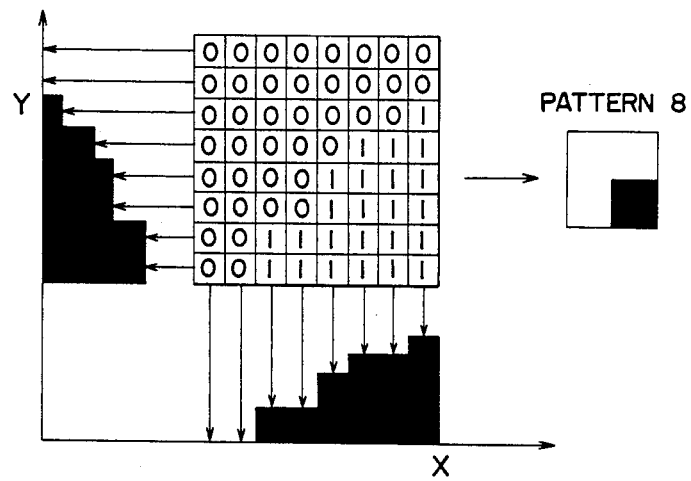
FIG. 12 illustrates the sorting of patterns.

Next, based on the aforesaid background level B as a threshold value, picture data are binary-coded, that is, each pixel is determined to be either foreground or background. Using the binary-coded picture data thus obtained, the blocks are sorted into prescribed patterns. For this purpose, sixteen foreground patterns (1 to G) and pattern 0, which is entirely background, as shown in FIG. 11, for instance, are prepared beforehand. These patterns have a larger variation in black and white respectively with their change from 0 to G, i.e. from (0, 1) to (2~5), (6, 7), (8~B), (C~F) and G in this sequence. The blocks can be sorted easily into the aforesaid patterns by using a computer or the like, according to such a method as shown in FIG. 12, for instance, in which the binary-coded picture data are projected in the two-dimensional directions (X-Y directions) to find the integrated number of foreground pixels ("1"), and a relevant pattern is determined from two integrated-number distributions in the X-Y directions. Since foreground pixels are concentrated in the lower right part of a block in the example of FIG. 12, the integrated number on the right side is large in the X direction, while the integrated number on the lower side is large in the Y direction, and a pattern 8 shows the same tendency as the above when it is projected in the two-dimensional directions. Thus, it is concluded that the given block corresponds to the pattern 8.

(IV) Extraction of picture regions

Figures 13A, 13B, 13C, 13D:
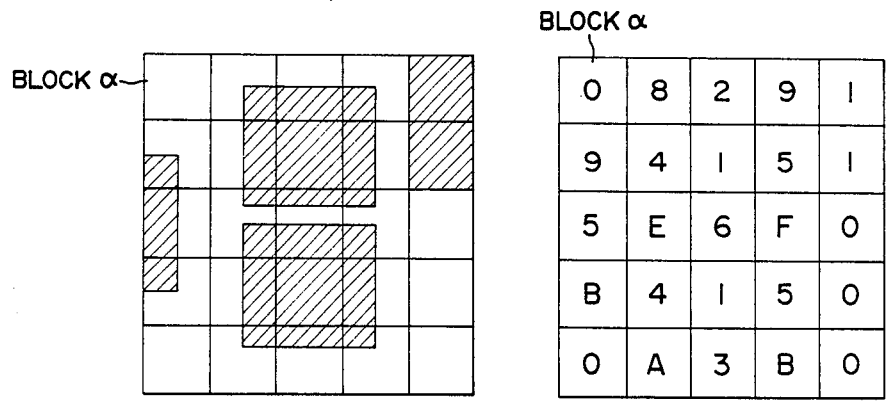
FIG. 13(a) to FIG. 13(d) illustrate the extraction of picture regions.

Connections between blocks may be checked either for each block as a unit, or for a block which is divided into two parts in the longitudinal and lateral directions respectively (four parts in the whole), for instance. FIG. 13(a) to FIG. 13(d) are simplified illustrations for showing the latter method. FIG. 13(a) is an illustration in which a picture is divided into blocks and a binary-coded picture is superposed thereon (the shadowed portions represent the regions of foreground pixels). FIG. 13(b) is an illustration in which the pattern number in FIG. 11 is given to each block. FIG. 13(c) is an illustration in which each block is divided into four as described above (a block $\alpha$ is divided into small blocks $\alpha_1$, $\alpha_2$, $\alpha_3$ and $\alpha_4$, for instance) and the pattern number in FIG. 11 is given to each of the small blocks thus obtained. It is very easy to obtain FIG. 13(c) from FIG. 13(b), since it can be known beforehand to which pattern each pattern comes to correspond when each pattern of FIG. 11 is divided into four. While each pattern of FIG. 11 may be selected so that it can correspond exactly to any one of the patterns of the same figure when it is divided into four, the approximate correspondence of a divided pattern to that of FIG. 11 is sufficient for the purpose of the present invention. Next, the connections between small blocks are to be checked. The determination of the presence of a connection between small blocks may be based on the fact that there are foreground portions at least in the respective parts of the joining sides of the patterns of two adjacent small blocks, for instance. Moreover, said determination of the presence of the connection may be given also in additional consideration of the entire form of the patterns. In any case, the combinations of the connection between the patterns are limited; therefore, the presence or absence of the connection between the small blocks can be determined very simply provided that the positional relationship between adjacent patterns which results in the connection between the small blocks is determined beforehand. FIG. 13(d) is an illustration showing picture regions which are obtained on the assumption that there is no connection between the small blocks when there is only a white portion on the joining sides of the patterns. In this figure, the regions having the same number are the picture regions of the same kind. Of course, the connections between the blocks may be checked by the above-described method without the aforesaid division into four. In this case, however, the boundaries between the regions will be rough. It could be thought to make the sizes of the block smaller initially so as to settle this problem of roughness. This method, however, would require much time for the analysis of the aforesaid texture.

Figure 17:
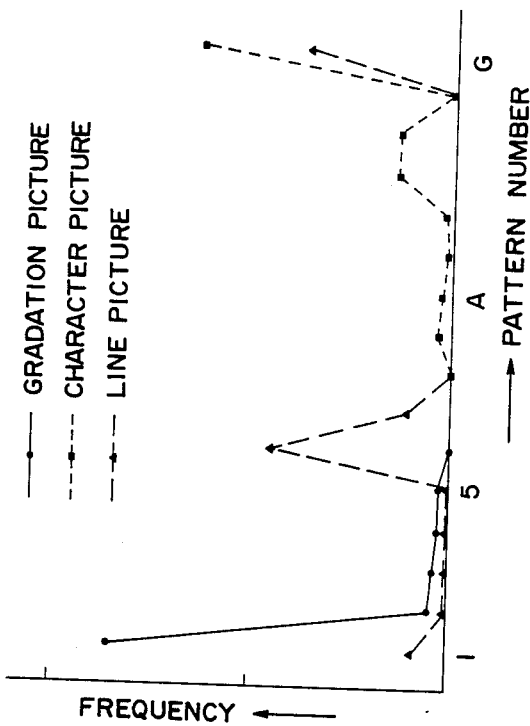
FIG. 17 is a graph showing the frequency of occurrence of certain patterns in different types of pictures.

As the results of the above-described processes, the regions of the given picture are extracted. The rate (frequency) of the presence of each pattern (shown in FIG. 11) in a halftone dot picture, a character picture and a line picture can be shown as in FIG. 17. It is also possible, accordingly, to determine what a picture in each picture region forms by knowing the distribution of patterns in each picture region.

Among the patterns in FIG. 11, the frequency of the presence of the pattern of pattern number 1 is high in the halftone dot picture region. The frequency of the presence of the pattern of pattern number G is high in the character picture region. If the frequency of the presence of the patterns of pattern numbers 2 to F (sum of 2 to F) is higher than that of pattern number 1 or G, the picture can be determined as a line picture.

It is also possible, accordingly, to extract more precise connected picture element region by applying again an input based on the above data and by binary coding again.

Figure 14:
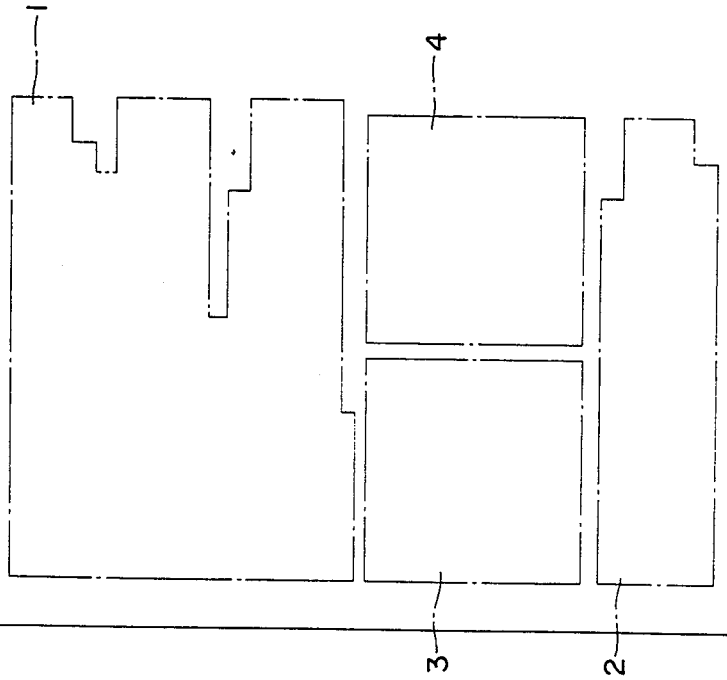
FIG. 14 is an illustration of an original picture.
Figure 15:
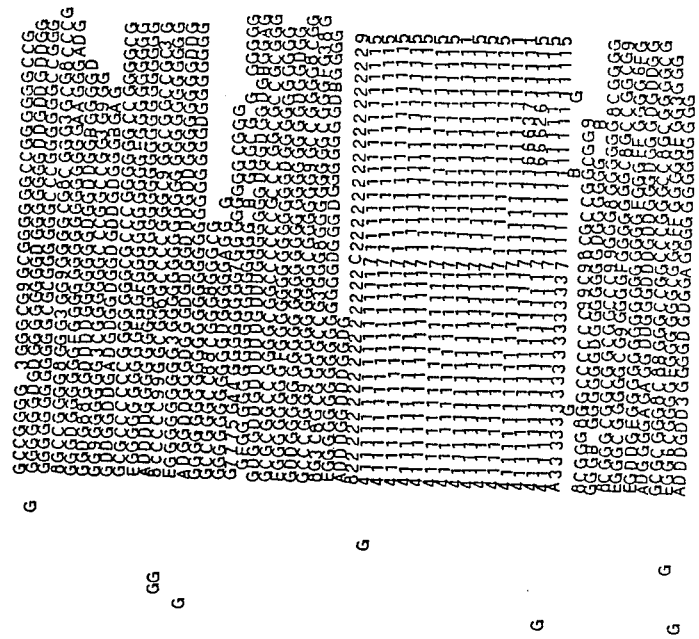
FIG. 15 shows a pattern-sorted picture.
Figure 16:
FIG. 16 shows a picture composed of extracted regions.

FIGS. 14 to 16 illustrate more concretely the extraction of the regions. FIG. 14 shows an original picture, FIG. 15 shows a picture composed of sorted patterns, and FIG. 16 shows a picture composed of extracted regions. The areas denoted by numerals 1 and 2 in FIG. 14 are filled with characters, while the areas denoted by numerals 3 and 4 therein form continuous tone pictures. Although the pictures can be extracted excellently as shown in FIG. 15, isolated regions (blocks) caused by stains in the original picture are present in FIG. 15, forming peculiar picture regions in FIG. 16. The occurrence of such noise can be prevented successfully by applying processing in which the isolated blocks are regarded as being included in the same picture regions with surrounding blocks.

After the picture regions are extracted as described above, the above-described method of discrimination is applied to each extracted picture region; hence, the efficient discrimination of pictures can be performed.

According to the method of the present invention, as described above, a halftone dot picture is recognized on the basis of the variation in the number of block pixels, etc. A line picture is recognized according to the rate of the background, and all others are recognized as continuous tone pictures. Therefore, there can be no false discernment of a continuous tone picture in which density varies sharply.

What is claimed is:

1. A method of discriminating whether a picture is a halftone dot picture, a continuous tone picture or a line picture, said picture containing at least one discrimination unit area therein, each said at least one discrimination unit including a plurality of foreground pixel regions, each of which regions consists of any one foreground pixel and any additional foreground pixels which are immediately adjacent to the one foreground pixel or any continuously adjacent pixels in one of the major directions, said method comprising the steps of:
   a. binary-coding the picture using a predetermined number of pixels, thereby determining whether each pixel of the picture is a foreground pixel or a background pixel;
   b. determining the statistical variation in at least one of the following:
      (1) the number of foreground pixels constituting foreground pixel regions within a discrimination unit area; and
      (2) the distance between said foreground pixel regions within a discrimination unit area;
   c. determining whether or not said discrimination unit area is part of a halftone dot picture from a known relation between said variation and whether said picture is a halftone dot picture; and
   d. if it is determined that the picture is not a half-tone dot picture, then determining from a ratio of background pixels to foreground pixels whether or not said discrimination unit area is of a line picture, according to a known relationship.

2. A method according to claim 1, wherein said discrimination unit areas are obtained by dividing the picture into a plurality of smaller areas.

3. A method according to claim 1, wherein
   the picture is divided into a plurality of blocks, there being the possibility of connections between said blocks,
   each block is sorted into prescribed patterns by using the binary coding of the picture,
   any connections between blocks are checked on the basis of said patterns so as to extract picture regions, and
   the extracted picture regions are used as the discrimination unit areas.

4. A method according to claim 3, wherein any data obtained by projecting two-dimensionally the binary coding of the picture of each of said plurality of blocks are used for sorting said blocks into patterns.

5. A method according to claim 3 or 4, wherein when the connections between said blocks are checked, each of the blocks is subdivided into four equal small blocks, and any connections between said small blocks and all small blocks surrounding them are checked.

6. A method according to claim 1, wherein
   the picture is divided into a plurality of blocks,
   the picture is sorted into prescribed patterns by using the binary coding of the picture, and
   the frequency of occurrence of the patterns is plotted to determine the type of picture.

7. A method of discriminating whether a picture is a halftone dot picture, a continuous tone picture or a line picture, said picture containing at least one discrimination unit area therein, each said at least one discrimination unit including a plurality of foreground pixel regions, each of which regions consists of any one foreground pixel and any additional foreground pixels which are immediately adjacent to the one foreground pixel or any continuously adjacent pixels in one of the major directions, said method comprising the steps of:
   a. determining the statistical variation in at least one of the following:
      (1) the number of foreground pixels constituting foreground pixel regions within a discrimination unit area; and
      (2) the distance between said foreground pixel regions within a discrimination unit area;
   b. determining whether or not said discrimination unit area is part of a halftone dot picture from a known relation between said variation and whether said picture is a halftone dot picture.

* * * * *